March 29, 1960   E. R. BIDLINGMAIER ET AL   2,930,652
ROOF RAIL MOLDING AND CLIP FOR A VEHICLE
Filed Oct. 3, 1957
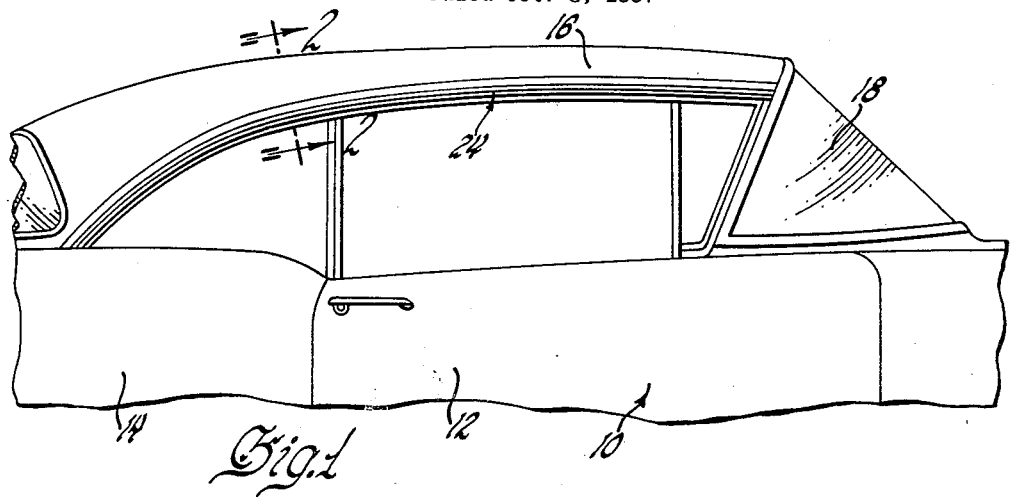
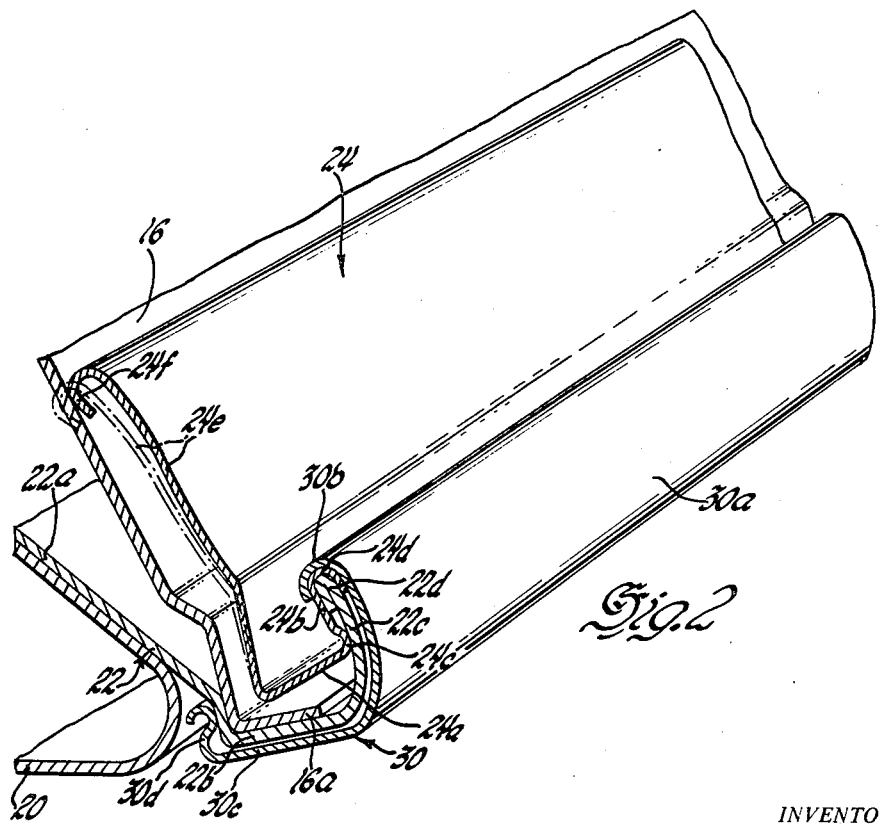
INVENTORS
Ernst Robert Bidlingmaier, &
BY Victor Henry Dutchik
W. S. Pettigrew
ATTORNEY

2,930,652

ROOF RAIL MOLDING AND CLIP FOR A VEHICLE

Ernst Robert Bidlingmaier, Detroit, and Victor Henry Dutchik, Utica, Mich., assignors to General Motors Corporation, Detroit, Mich., a corporation of Delaware Application October 3, 1957, Serial No. 688,060

3 Claims. (Cl. 296—137)

This invention relates to a roof rail molding and clip for a vehicle, and more particularly to a decorative molding and clip combination for an automobile drip trough.

One feature of the invention is that it provides an improved roof rail molding and clip structure; another feature of the invention is that it provides a roof rail molding which may be snapped into the drip trough and a retaining scalp clip which may be snapped over the molding and the drain trough to form a decorative structure along the side of the automobile roof; a further feature of the invention is that the structure requires no screws, rivets or other permanent fastening means, and requires no holes to be drilled in the roof or drip molding structure of the automobile; a further feature of the invention is that the roof rail molding is of spring material and is flexed when it is mounted to insure tight engagement with the automobile roof without rattling; and yet another feature of the invention is that the retaining scalp is clipped to the roof rail at one edge and to the drip molding at the other edge to insure a tightly holding structure which does not rattle.

Other features and advantages of the invention will be apparent from the drawings and from the following description, in which:

Fig. 1 is a fragmentary side elevation of an automobile incorporating the improved roof rail molding and clip structure; and Fig. 2 is an enlarged isometric section through a portion of the roof and drip trough taken along the line 2—2 of Fig. 1.

Automobiles which have closed bodies usually are provided along the side edge of the roof with a drip trough to catch rain. It is often considered desirable to mask the drip trough with a decorative molding which clips onto the drip trough or which is secured to it by some other means, and such moldings are well known in the art. This invention is directed to a structure including a molding which seats in the drip trough and extends up above the drip trough into abutting relation with the roof, in combination with a retainer clip which itself is a decorative molding and which clips over the upper edge of the first molding and the drip trough to hold the first molding in place. The retainer clip provides a decorative molding over the drip trough itself.

Referring now more particularly to the drawings, an automobile designated generally as 10 in Fig. 1 has a door 12, a rear quarter 14 and a roof 16 extending from the windshield 18 back to the rear quarter 14. Along its side edge the roof is formed with a drip trough as shown more clearly in Fig. 2. Referring to this figure, the roof panel 16 has a downwardly sloping side portion terminating in an outwardly bent flange 16a. A conventional roof rail structure 20 is inside the roof panel along the side of the automobile body and a drip trough 22 is formed by a sheet member which has a mounting portion 22a welded or secured in some other conventional manner to the upper surface of the roof rail 20. The mounting portion 22a merges into a base portion 22b which extends under the flange 16a of the roof panel and is welded thereto. The trough itself is formed by the roof panel flange 16a, by the base portion 22b of the sheet member and by an upwardly turned flange or wall 22c of the sheet member which terminates in a rolled upper edge 22d. This construction is conventional and well known in automobile bodies.

An elongated molding strip designated generally as 24 is formed of spring material which presents a decorative surface, as for example stainless steel. This molding strip has a base 24a which seats in the drip trough and which is formed along its outer edge with an upwardly turned side flange 24b. A bead 24c is rolled outwardly at the juncture of the side flange 24b and the base 24a and at its upper edge the side flange is curled outwardly at 24d. The molding also has an integral stem or inner leg 24e extending from the inner edge of the base up out of the drip trough and terminating in a rolled edge 24f which rests in abutting relation upon the downwardly sloping portion of the roof panel 16. As shown in Fig. 2, the spring material of the molding is flexed outwardly from its free position to hold the rolled edge 24f tightly against the roof panel and prevent rattling. The curled edge 24d is formed on the arc of the rolled edge 22d of the drip trough so that it may be snapped over the upwardly facing free edge of the drip trough, and the bead 24c at the juncture of the base and the side flange of the molding abuts against the inner surface of the side flange 22c to hold the molding tightly in the drip trough.

An elongated retaining scalp designated generally as 30 is formed of spring material (as stainless steel) having a decorative outer surface. The scalp retainer is generally C-shaped in transverse section and has one leg 30a which overlies the drip trough wall 22c and which is formed at its edge with an inwardly rolled flange 30b which is formed on the curve of the outer surface of the molding edge 24d so that it may be clipped over the curled edge of the molding. The other leg 30c of the scalp retainer underlies the drip trough base and terminates in an inwardly rolled edge flange 30d which is clipped over the lower inner corner of the drip trough.

The construction described above provides a decorative molding arrangement for the lower portion of the roof and for the entire drip trough. The molding 24 and the retainer 30 may be used if desired or they may be omitted without changing any of the automobile body construction. To assemble the parts, the molding 24 is seated in the drip trough and then the curled edge is clipped over the upwardly facing free edge of the drip trough, the leg 24e being flexed during this operation and being held in flexed position by abutment of the bead 24c with the inner wall of the drip trough. After the molding 24 has been mounted, the scalp retainer 30 is simply clipped on over the outer surface of the drip trough to hold the molding 24 in its proper position. This construction completely hides the drip trough and provides a neat one-piece appearance.

While we have shown and described one embodiment of our invention, it is capable of many modifications. Changes, therefore, in the construction and arrangement may be made without departing from the spirit and scope of the invention as set forth in the appended claims.

We claim:

1. In a vehicle, a roof having a downwardly sloping side portion which terminates in a drip trough with an upwardly facing free edge; an elongated molding strip which is generally L shaped in transverse section, said molding strip having a base which seats in said trough and which is formed along one edge with an upwardly turned side flange having a curled edge which overlies the outer free edge of the drip trough, and said molding having an inner leg extending from the other edge of the base up out of said drip trough and terminating in abutting relation with the downwardly sloping side portion of the roof; and an elongated retaining scalp which is generally C shaped in transverse section, having one leg formed with an inwardly rolled edge flange overlying the curled edge of said molding and the other leg underlying said trough and clipped to the lower inner side thereof.

2. In a vehicle, a roof having a downwardly sloping side portion which terminates in a drip trough with an upwardly facing free edge; an elongated molding strip of spring material which is generally L shaped in transverse section, said molding strip having a base which seats in said trough and which is formed along its outer edge with an upwardly turned side flange having an outwardly curled edge which is clipped on and overlies the upwardly facing free edge of the drip trough, and said molding having an inner leg extending from the inner edge of the base up out of said drip trough and terminating in a rolled edge having abutting relation with the downwardly sloping side portion of the roof, said inner leg being flexed outwardly to hold the rolled edge in tight engagement with the roof; and an elongated retaining scalp of spring material which is generally C-shaped in transverse section, having one leg formed with an inwardly rolled edge flange clipped over the curled edge of said molding and the other leg formed with an inturned flange which is clipped over the lower inner side of said trough.

3. In a vehicle, a roof panel having a downwardly sloping side portion terminating in an outwardly bent flange; a roof rail adjacent the inner side edge of said panel; a drip trough clamped between the roof panel and the roof rail, said trough terminating at its outer edge in an upwardly facing free edge; an elongated molding strip of spring material which is generally L shaped in transverse section, said molding strip having a base which seats in said trough and which is formed along its outer edge with an upwardly turned side flange having an outwardly curled edge which is clipped on and overlies the upwardly facing free edge of the drip trough, and said molding having an inner leg extending from the inner edge of the base up out of said drip trough and terminating in a rolled edge having abutting relation with the downwardly sloping side portion of the roof, said inner leg being flexed outwardly to hold the rolled edge in tight engagement with the roof; and an elongated retaining scalp of spring material which is generally C shaped in transverse section, having one leg formed with an inwardly rolled edge flange clipped over the curled edge of said molding and the other leg formed with an inturned flange which is clipped over the lower inner side of said trough.

References Cited in the file of this patent

UNITED STATES PATENTS

| | | |
|---|---|---|
| 1,670,465 | Marshall | May 22, 1928 |
| 1,703,939 | Kellogg | Mar. 5, 1929 |
| 1,797,792 | Potter | Mar. 24, 1931 |
| 1,823,541 | Herron | Sept. 15, 1931 |
| 2,576,354 | Oswald | Nov. 27, 1951 |

FOREIGN PATENTS

| | | |
|---|---|---|
| 360,762 | Great Britain | Nov. 12, 1931 |